(12) United States Patent
Santiago

(10) Patent No.: US 7,096,455 B2
(45) Date of Patent: Aug. 22, 2006

(54) METHOD AND SYSTEM FOR REPRESENTING AND ACCESSING DATA FOR COMPUTER SOFTWARE APPLICATIONS

(75) Inventor: Stanley P. Santiago, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 951 days.

(21) Appl. No.: 09/883,230

(22) Filed: Jun. 19, 2001

(65) Prior Publication Data

US 2003/0020752 A1    Jan. 30, 2003

(51) Int. Cl.
*G06F 9/44* (2006.01)

(52) U.S. Cl. .................. 717/114; 717/108; 717/116

(58) Field of Classification Search ............ 717/108, 717/114, 116–118, 124, 127, 128, 129, 148, 717/165
See application file for complete search history.

(56) References Cited

U.S. PATENT DOCUMENTS

| | | | | |
|---|---|---|---|---|
| 6,167,564 | A * | 12/2000 | Fontana et al. | 717/104 |
| 6,675,354 | B1 * | 1/2004 | Claussen et al. | 715/513 |
| 6,675,370 | B1 * | 1/2004 | Sundaresan | 717/106 |
| 6,718,515 | B1 * | 4/2004 | Conner et al. | 715/509 |
| 6,718,516 | B1 * | 4/2004 | Claussen et al. | 715/513 |
| 6,721,747 | B1 * | 4/2004 | Lipkin | 707/10 |
| 6,732,330 | B1 * | 5/2004 | Claussen et al. | 715/513 |
| 6,850,893 | B1 * | 2/2005 | Lipkin et al. | 705/8 |
| 6,873,984 | B1 * | 3/2005 | Campos et al. | 707/6 |

OTHER PUBLICATIONS

Josifovski et al, "Querying XML streams", The VLDB Jour, 14: 197-210, 2005.*
Suzuki et al, "Manging the software design documents with XML", ACM pp 127-136, 1998.*
Liefke et al, XMill: an efficeint compressor for XML data, ACM MOD, pp 153-164, 2000.*
Royappa, "Implementing catalog clearinghouse with XML and XSL", ACM SAC, pp 616-623, 1999.*
"What is Jox?", <www.wutka.com/jox.html>.
Document Object Model (DOM) Level 3 Core Specification version 1.0, Jun. 5, 2001, <www.w3.org/DOM/>.
XML Path Language (XPath) version 1.0, Nov. 16, 1999, <www.w3.org/TR/xpath.html>.

* cited by examiner

*Primary Examiner*—Anil Khatri
(74) *Attorney, Agent, or Firm*—Finnegan, Henderson, Farabow, Garrett & Dunner L.L.P.

(57) ABSTRACT

A method and system are provided for defining a Web application including a graphical user interface and a functional component. A custom tag library is accessed, wherein the custom tag library includes one or more tags facilitating the use of XPath in JavaServer Pages (JSPs). A JSP representing the graphical user interface is defined. One or more tags is included in the JSP definition to enable interaction between the user interface and the functional component.

20 Claims, 4 Drawing Sheets

METHOD AND SYSTEM FOR REPRESENTING AND ACCESSING DATA FOR COMPUTER SOFTWARE APPLICATIONS

DESCRIPTION OF THE INVENTION

1. Field of the Invention

This invention relates generally to computer software applications for execution in connection with Web servers.

2. Related Art

Computer software applications for execution in connection with servers typically utilize a client-server architecture, as is illustrated in FIG. 1A. As shown, user requests 102 for data are sent by a client 100 to a server 104. The server 104 will present the requested data as server responses 106 to the client 100. Client 100 and server 104 represent processes. The client may be active in a first computer system, and the server may be active in a second computer system. The client and server may communicate with one another over a communication medium, thus providing distributed functionality and permitting multiple clients to take advantage of the data of the server.

Clients and servers on the World Wide Web (Web) communicate using the functionality provided by Hypertext Transfer Protocol (HTTP). The Web includes all the servers adhering to this standard which are accessible to clients via Uniform Resource Locators (URL's). In this context, the process associated with client 100 is called a browser, which establishes a connection with the process associated with server 104, called a Web server. The browser presents information to the user. Any number of commercially or publicly-available browsers may be used in various implementations.

The Web server presents information to the browser in the form of HTTP responses. The HTTP responses correspond with the Web pages, and may include instructions for providing interaction between a user associated with the browser and the Web server.

Traditionally, computer programs were developed for a specific operating system (OS), and programs written for one platform could not be run on another platform. The Internet, however, has made cross-platform compatibility a necessity. Technology developed by Sun Microsystems, Inc., including the Java™ Virtual Machine (JVM), provides a universal platform that operates across the multiple combinations of operating systems and hardware that make up the Internet. The JVM is a software-based computing entity that remains consistent regardless of platform and, thus, shields programmers from underlying OS/hardware variations.

FIG. 1B illustrates how the JVM enables cross-platform applications over the Internet. Computer 108 and computer 110 are connected to server 120, via a network 130, such as the Internet. Server 120 may provide resources and applications to computers 108 and 110. Computer 108 represents one platform, such as a computer running the Solaris™ operating system, while computer 110 represents another platform, such as a computer running the Macintosh® operating system or running the Windows®95/98 operating system. Both computer 108 and computer 110, however, are provided with a JVM 150. JVM 150 is a process executed by the computer 108, 110 that acts like an abstract computing machine, receiving instructions in the form of byte codes, interpreting these byte codes by dynamically converting them into a form for execution and executing the converted byte codes.

Most applications include a graphical user interface (GUI) that permits the user to interact with the application. The GUI provides an easy-to-use interface for the user and may include one or more interface objects, such as clickable buttons or text fields. The JVM includes an event monitor for processing a user's interaction with these interface objects, such as the clicking of a mouse button or the typing of a keystroke. GUIs are increasing in complexity as the applications that users interact with via GUIs become more sophisticated. Further, the number and types of interactions that must be supported by a GUI have also increased.

Along with this increase in complexity and requirements, a paradigm has arisen in Web application design. Typically, at least two groups of people are involved in the design process. One group consists of page authors, with expertise in the design and presentation of user interfaces. The other group consists of programmers, with expertise in server-side logic. Programmers write the actual functional application. Rarely do you find an individual with both interface design and programming skills so it is typically necessary to have an individual from each group collaborate on the design and implementation of a Web application.

One pattern that expresses this paradigm is the Model-View-Controller (MVC) pattern, illustrated in FIG. 2. This MVC pattern includes three components, namely a controller component 200, a model component 210, and a view component 220, all of which may be present on a server 120. The controller component 200 links the model component 210 and the view component 220. The model, or business object, component 210 is an application with no external interface. Model component 210 may access a persistent storage mechanism 212, such as a database. Exemplary model components 210 may be written in the Java programming language and interpreted by a JVM 150 at a user's computer 108. View component 220 includes one or more graphical frames through which the user interacts with model component 210. A Web browser may execute the view component instructions, as interpreted by the JVM, on the user's computer 108 to display elements of the GUI as provided by view component 220.

Some developers use JavaServer™ Pages (JSP™), written in JSP code, to create view components 220 for a Web application. JSP permits rapid development of Web pages using Extensible Markup Language-like tags to access JavaBean™ resources. JavaBeans are reusable software components written in the Java language, including GUI components. Thus, parts of JSP pages typically execute via a JVM 150. A page author using JSP can design and change a Web page (the view component) without altering, or even understanding, the underlying functional content (the model component). However, the page author must still have a working knowledge of the Java language to design a view component that properly interacts with the functional content of the model component.

Another problem arising in Web applications is the need to represent and access data of differing types. One solution to this problem is use of Extensible Markup Language (XML). XML provides for a Document Object Model (DOM) for defining a standard way to represent diverse data sources. Specifically, the DOM is a platform-independent interface allowing dynamic access to the content, structure, and style of documents. The DOM provides a hierarchical naming structure that permits all objects in a page (or document), including images, forms, properties, and objects, to be accessible to scripting languages. Further information about the DOM specification may be found at www.w3.org/DOM/, which is herein incorporated by reference.

XML Path Language (XPath) provides a syntax for specifying and selecting parts of an XML document or DOM. A DOM can be considered a tree of elements with only one path or route from the root node of the tree to any other node of the tree, similar to computer filing systems. Basic XPath syntax is similar to file system addressing. For example, if the path starts with a "/", it represents the absolute path to a required element. Consider the exemplary, simplified XML document below:

```
<user>
    <userid> someone </userid>
    <password>somewhere</password>
    <roles>
        <roleid = "admin">Domain Administrator</role>
        <roleid = "helpdesk>Help Desk Administrator </role>
    </roles>
</user>
```

This document represents a user, having both a user id and a password. Additionally, the user has multiple roles, namely Domain Administrator and Help Desk Administrator. The following examples illustrate the use of XPath syntax to access the data in the above XML document.

| | |
|---|---|
| /user/userid/text() | select 'someone' |
| /user/roles/role | select all 'role' elements |
| //role | select all 'role' elements |
| //role[@id ='admin']/text() | select "Domain Administrator" |
| /user/roles/role[1] | select first role (i.e., Domain Administrator] |

Further details about the XPath syntax can be found at www.w3.org/TR/xpath.html, which is herein incorporated by reference.

SUMMARY OF THE INVENTION

Because of the simplicity and functionality provided by XML, and specifically XPath, it is desirable to use XPath within JSPs to access and manipulate data in Web applications. Further, the use of XPath in JSPs would provide for greater separation of the roles of page author and programmer as the use of XPath would permit the elimination of the use of Java™ in JSPs. Current implementations of JSP do not support the use of XPath in this manner.

It is therefore desirable to have a method and system that reduces complexity in representing and accessing data in a Web application environment, while improving functionality. Further, it is desirable to provide a method and system that facilitates the separation of roles of a page author and a programmer.

A method is provided for defining an application including at least two parts, a graphical user interface and a functional component. A custom tag library is accessed, wherein the custom tag library includes one or more tags facilitating the use of XPath syntax in JSPs. A JSP representing the graphical user interface is defined. One or more tags is included in the JSP definition to enable interaction between the user interface and the functional component. The custom tag library may include tags for indicating to the functional component to perform one or more of the following functions: substituting attribute values, substituting element values, iteration, testing the validity of an expression, or creating a document object model instance.

Further, a method is provided for accessing data represented by a document object model (DOM) in a system including a custom tag library facilitating the use of XPath. First, an instruction, including a tag associated with the custom tag library, to access data is received. An action is determined based on the included tag. Target data, on which the action is to be performed, is determined by parsing the instruction to obtain an XPath instruction indicating the target data. The action is then performed on the target data.

A system is provided for implementing an application including a user interface defined by a JavaServer™ Page (JSP), wherein the JSP includes custom tags facilitating the use of XPath. The system includes a JSP module for executing instructions in a user interface definition. The system also includes a custom tag library for resolving a custom tag included in the instructions in the user interface definition. Further, the system includes a tag handler, which parses the custom tag included in the instructions and evaluates the XPath instruction based on the custom tag.

Additional features of the invention will be set forth in part in the description which follows, and in part will be obvious from the description, or may be learned by practice of the invention. Aspects of the invention will be realized and attained by means of the elements and combinations particularly pointed out in the appended claims.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate one embodiment of the invention and together with the description, serve to explain the principles of the invention. In the Figures:

DETAILED DESCRIPTION

Methods and systems consistent with the present invention facilitate access to data in a Web application environment by enabling the use of XPath. Further, methods and systems consistent with the present invention facilitate separating the roles of a page author and a programmer. Specifically, methods and systems consistent with the present invention provide a custom tag library that facilitates the use of XPath in JSPs. The custom tag library may include one or more tags for performing one or more functions on data identified by the XPath instruction, such as substituting values, iterating an expression, testing the validity of an expression or creating an instance of a DOM document. A page author may use these tags from the custom tag library when defining a user interface using JSPs. The page author may have information about a DOM document as provided by the programmer and thus may use the tags to interact with the DOM document. In this way, the page author requires minimal knowledge of the functional portion of the application. Further, the use of the tags permits straightforward access to data.

Figure 1A:
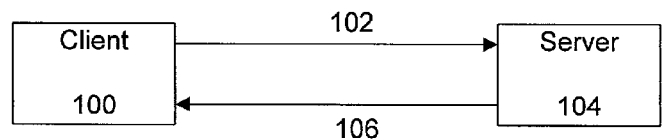
FIG. 1A illustrates an exemplary client-server architecture.
Figure 1B:
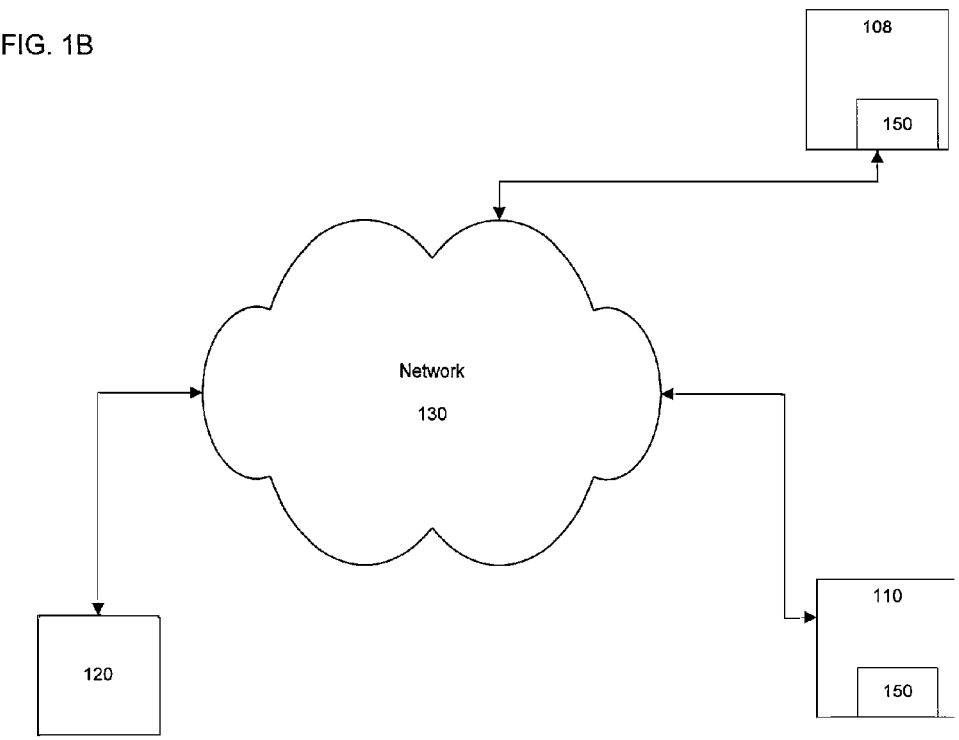
FIG. 1B illustrates an exemplary cross-platform environment.
Figure 2:
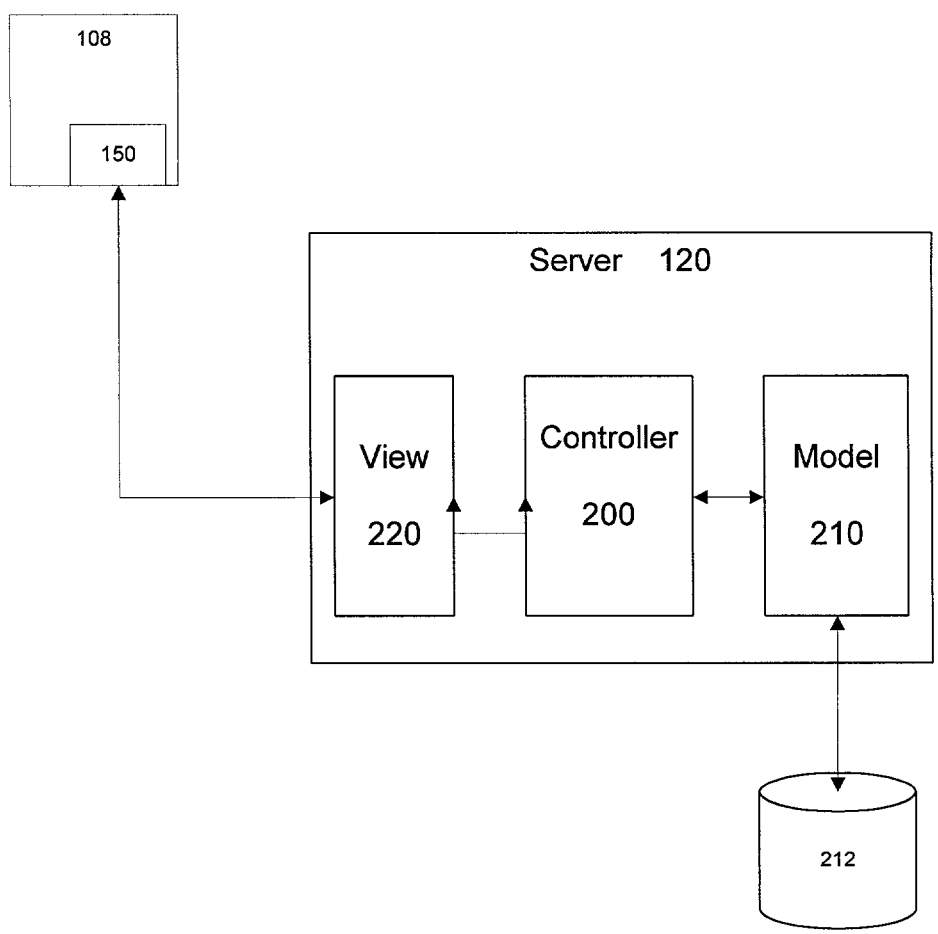
FIG. 2 illustrates an exemplary model-view-controller pattern.
Figure 3:
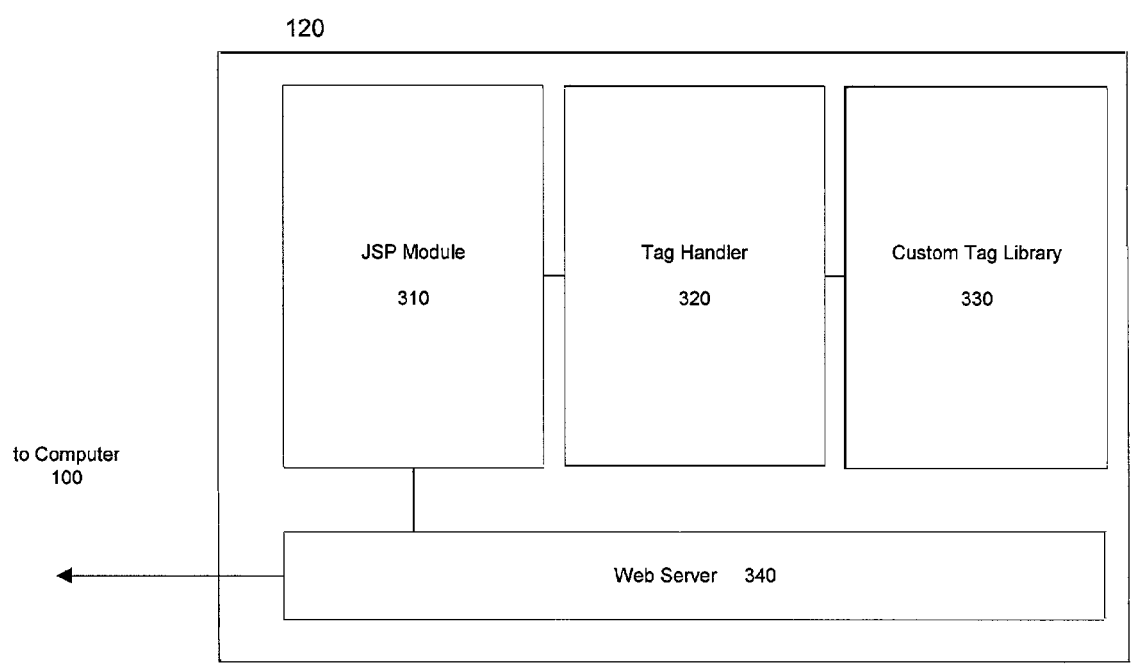
FIG. 3 illustrates a portion of an exemplary server, consistent with the present invention.

FIG. 3 illustrates a portion of an exemplary server 120, consistent with present invention. Server 120 includes JSP module 310, tag handler 320, custom tag library 330, and Web server 340. JSP module 310 executes instructions including a graphical user interface utilizing JSP code. If the JSP code includes a custom tag, JSP module 310 interacts with tag handler 320 to resolve the instruction. Tag handler 320 parses the instruction into the custom tag and the XPath expression. Tag handler 330 interacts with custom tag library 330 to determine what action should be taken, based on the custom tag. Tag handler 330 also resolves the XPath expression based on the custom tag. When the user interface has been resolved by JSP module 310, the interface is provided to Web server 340 which, in turn, provides the interface to a user, for example, at computer 108.

Figure 4:
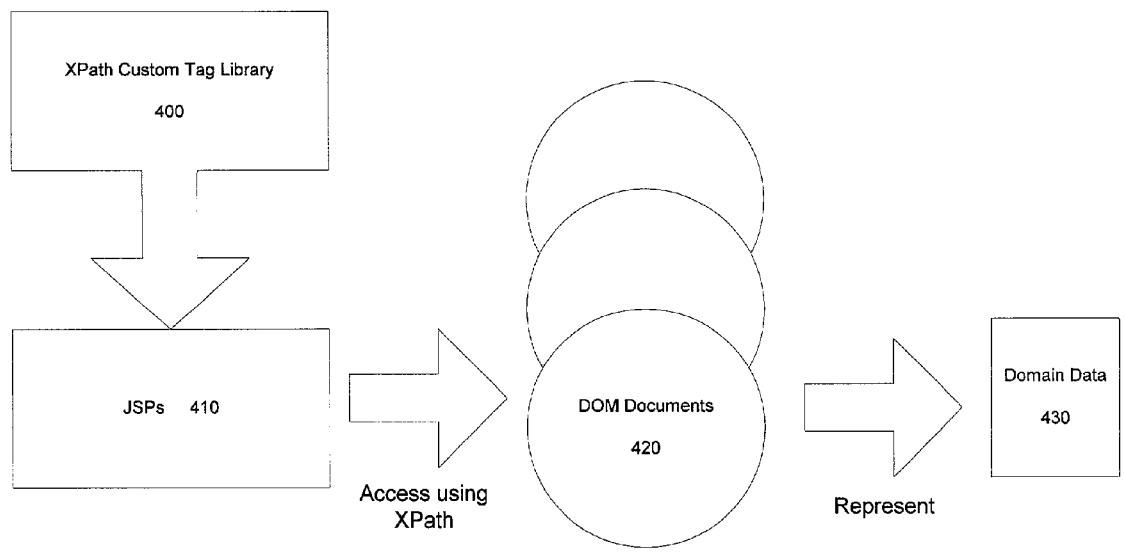
FIG. 4 illustrates an exemplary Web application architecture, consistent with the present invention.

FIG. 4 is a block diagram used to explain how the above described components interact with each other. XPath tag library 400 provides a framework within which dynamic content, represented as a DOM document, can be manipulated and inserted into a JSP 410. This simplifies the JSP code and eliminates the need for the page author to use Java in order to interact with the DOM document and the model component. The presentation JSPs, created by the page author, access domain data or resources, represented as DOM document instances 420, using XPath instructions. The result includes the desired data 430. The page author uses the XPath custom tag library to embed XPath instructions in the JSPs. The programmer is responsible for ensuring the model component invokes DOM document instances. The programmer may provide general information about the DOM document to the page author, or may provide a Document Type Definition (DTD), which provides the DOM document structure and may prove helpful in writing the XPath expressions, embedded in the JSPs.

XPath Custom Tag Library

The Custom Tag Library includes various tags for combining the functionality of XPath with the Web design ability of JSPs. A description of exemplary tags follows.

Tag: XPathTemplate: The XPath Template tag is used to provide a scope for subsequent XPath expressions. The XPath Template tag also enables dynamic substitutions, via the use of a special syntax. Specifically, for example, upon receiving an instruction containing a Template tag, tag handler 320 parses the body contents of the instruction and looks for a pattern beginning with "${" and ending with "}". If this pattern is found, the value enclosed within the patterns is treated as an XPath expression. The value is then evaluated with respect to the DOM and the result is rewritten. Consider the instructions below:

```
<mytag:xpathtemplate scope = "/ORDER/SHIPTO">
NAME: <input type = "text" name = "name"
    value ="${./NAME}"/> <BR/>
</mytag:xpathtemplate>
```

The scope attribute is then determined to be "/ORDER/SHIPTO" and this context is applied to subsequent XPath expressions. When tag handler 320 locates the expression "${./NAME}", the expression is evaluated in the context of "/ORDER/SHIPTO". The final result of the expression is the value located at "/ORDER/SHIPTO/NAME".

Tag: iterate: The iterate tag allows iteration over an XPath expression that results in multiple nodes, and is used in conjunction with the getvalue tag, described below. For example, if a DOM included several <ITEM> . . . </ITEM> elements, an instruction including mytag:iterate select "/ITEM" with a further evaluation, such as getvalue, would cause the tag handler to go through each of the several ITEM elements and obtain the desired values.

Tag: getvalue: The getvalue tag obtains the result of an XPath expression. For example, if the instruction includes the language "mytag:getvalue select="/ORDER/SHIPTO/NAME"" the tag handler will obtain the value stored at the location represented by the XPath expression, or in this case, the value found at /ORDER/SHIPTO/NAME.

Tag: ifdef: The ifdef tag tests if the XPath expression is valid and maps to a defined node. If the test returns true, then the body of the tag is evaluated. For example, the instruction "mytag:ifdef select="/ORDER/SHIPTO"" would determine if a node exists for this location. If true, then the XPath is evaluated.

Tag: ifnodef: In contrast to ifdef (described above), the ifnodef tag tests if the XPath expression is invalid, or if no corresponding node for the XPath expression exists. If the test returns true, the body of the tag (an XPath expression) is evaluated.

Tag: gencontent: The gencontent tag creates a DOM document instance for the XML in its body. The gencontent tag includes a debug attribute, which when set to 'on', serializes the DOM to the standard output.

An XPath Custom Tag Library Example

The following example illustrates various XPath custom tag library options. This example deals with customer orders. An exemplary sample order XML document may be represented as follows:

[038] Order.xml

```
<ORDER>
    <SHIP TO>
        <NAME>ALICE SMITH</NAME>
        <STREET>123 MAPLE STREET</STREET>
        <CITY>MILL VALLEY</CITY>
        <STATE>CA</STATE>
        <ZIP>90952</ZIP>
    </SHIP TO>

<DATE>12-31-2001</DATE>

< !-- MULTIPLE ITEM ELEMENTS -- >

<ITEM>
        <TITLE> Twelve Songs of Christmas</TITLE>
        </ARTIST> Jim Reeves</ARTIST>
        <PRICE>15.95</PRICE>
    </ITEM>

<ITEM>
        <TITLE> First Piano Concerto</TITLE>
        </ARTIST> Janos</ARTIST>
        <PRICE>12.95</PRICE>
    </ITEM>

< !-- More items here -- >
```

</ORDER>

The above XML document consists of a ShipTo address, Date, and repeating Item elements. The Web application keeps an instance of the Order XML document in memory as a DOM document object. The following examples illustrate using XPath expressions in a JSP, which accesses the sample Order DOM document.

The following example illustrates HTML code, similar to that written by a page author, for accessing data from the DOM instance by the JSP.

[041] viewOrder.jsp

```
<%@ page errorPage="error.jsp" %>
<%@ taglib uri="/src/tags/taglib.tld" prefix="mytag" %>

<html>

<head>
  <title>View Orders</title>
 </head>
 <body bgcolor="white" link="#666699" vlink="#666699">

<B> OrderDate: </B> <mytag:getvalue select="/ORDER/DATE" /> <BR>

<HR>
 <!-- ifdef tag checks whether the Xpath expression is valid -->
 <mytag:ifdef select="/ORDER/SHIPTO" >

<B> ShipTo: </B> <BR/>
  <mytag:getvalue select="/ORDER/SHIPTO/NAME" /> <BR>
  <mytag:getvalue select="/ORDER/SHIPTO/STREET" /> <BR>
  <mytag:getvalue select="/ORDER/SHIPTO/CITY" /> <BR>
  <mytag:getvalue select="/ORDER/SHIPTO/STATE" /> <BR>
  <mytag:getvalue select="/ORDER/SHIPTO/ZIP" /> <BR>

</mytag:ifdef>

<HR>

<!-- The -iterate custom tag- iterates through the repeating element "ITEM"
  The -getvalue custom tag- substitutes the result of the XPATH expression
  for the current iteration -->

<mytag:iterate select="/ORDER/ITEM" >

<p>
     <B> ARTIST: </B> <mytag:getvalue select="./ARTIST" />
     <B> TITLE : </B> <mytag:getvalue select="./TITLE" />
     <B> PRICE : </B> <mytag:getvalue select="./PRICE" />

<BR>

</mytag:iterate>

</body>
</html>
```

The above code uses three tags from the XPath tag library: getvalue, ifdef, and iterate. The getvalue tag applies the XPath expression specified in the select, on the Order DOM document instance and substitutes the result. The conditional ifdef tag evaluates its body content only if the XPath expressions specified in its select are valid. iterate, an iteration tag, parses its body contents for each iteration. In this case, the select attribute specifies a node set to be retrieved which is then iterated over. Note that the getvalue tag, when used within the iterate tag, specifies a relative XPath expression in its select attribute.

The following exemplary JSP uses XPath expressions to access the ShipTo data from the DOM instance, which is then edited using an HTML form.

```
<%@ taglib uri="xpathtag" prefix="mytag" %>

<html>

<!-- Attribute value substitution is done by using the ${}
       pattern and enclosing in the XPathTemplate tag -->

<form method="POST" >

<mytag:xpathtemplate scope="/ORDER/SHIPTO" >

NAME: <input type="text" name="name"
    value="${./NAME}"/> <BR/>
    STREET: <input type="text" name="street"
        value="${./STREET}"/> <BR/>

CITY : <input type="text" name="city"
    value="${./CITY}"/> <BR/>

STATE: <input type="text" name="state"
    value="${./STATE}"/> <BR/>
```

```
    ZIP: <input type="text" name="zip"
    value="${./ZIP}"/> <BR/>

</mytag:xpathtemplate>

</form>

</html>
```

The above example illustrates the use of the XPath Template container tag, which enables XPath expression results to be substituted in attribute values. The XPath Template tag parses the body contents of the instruction and looks for a pattern beginning with "${" and ending with "}". If this pattern is found, the value enclosed within the patterns is treated as an XPath expression. The value is then evaluated with respect to the DOM and the result is rewritten.

Two techniques for creating a DOM document instance to represent the domain data are domain data classes and JavaBean objects. Domain data classes, for example Order.java, could return a DOM document using a toDom( ) method. Alternatively, domain data may be represented as a set of JavaBean objects translated to DOM document instances at run time. While the second method is preferable, it carries a performance penalty due to the overhead involved in translating from a JavaBean to a DOM document. Details regarding translating JavaBeans to XML are described at "What is JOX?", found at www.wutka.com/jox.html.

The custom tag library offers a unique solution to making presentation code, or the code defining the view component, simpler. Further, the XPath-JSP custom tag library permits the page author to create a Web page, or view component, that functions fully with the underlying Java application, or model component, without requiring the page author to know Java. The tag library forces separation of presentation and content by providing a small set of tags that enable the use of XPath expressions in JSPs to access DOM documents. Though this requires the learning of XPath syntax, the basic syntax is easy to pick up. The DOM documents are fully processed in the backend, which keeps the presentation layer clean and simple.

The above-noted features and other aspects and principles of the present invention may be implemented in various system or network environments to provide automated computational tools for receiving purchasing data, identifying suppliers, and organizing data, reporting organized data, storing associations extracted from the organized data, and administering stored data. Such environments and applications may be specifically constructed for performing various processes and operations of the invention or they may include a general purpose computer or computing platform selectively activated or reconfigured by program code to provide the necessary functionality. The processes disclosed herein are not inherently related to any particular computer or apparatus, and may be implemented by a suitable combination of hardware, software, and/or firmware. For example, various general purpose machines may be used with programs written in accordance with the teachings of the invention, or it may be more convenient to construct a specialized apparatus or system to perform the required methods and techniques. The present invention also relates to computer readable media that include program instruction or program code for performing various computer-implemented operations based on the methods and processes of the invention. The media and program instructions may be those specifically designed and constructed for the purposes of the invention, or they may be of the kind of well-known and available to those having skill in the computer software arts. Examples of program instructions include both machine code, such as produced by a compiler, and files containing a high level code that can be executed by the computer using an interpreter.

Other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for defining an application for execution, wherein the application includes a graphical user interface and a functional component, the method comprising:
   accessing a custom tag library, wherein the custom tag library includes one or more tags each designating an XPath operation;
   defining a script to represent at least a portion of the graphical user interface; and
   including in the defined script at least one of the tags to enable interaction between the graphical user interface and the functional component.

2. The method of claim 1, wherein the one or more tags in the custom tag library includes tags for performing one or more of the following functions:
   substituting attribute values, substituting element values, iteration, testing the validity of an expression, or creating a document object model instance.

3. The method of claim 1, wherein a tag in the custom tag library provides a scope for an XPath expression.

4. The method of claim 1, wherein a tag in the custom tag library allows iteration over an XPath expression.

5. The method of claim 1, wherein a tag in the custom tag library obtains a value stored at a location represented by an XPath expression.

6. The method of claim 1, wherein a tag in the custom tag library tests the validity of an XPath expression.

7. A method for defining an application for execution, wherein the application includes a graphical user interface and a functional component, the method comprising:
   accessing a custom tag library, wherein the custom tag library includes one or more tags each designating an XPath operation;
   defining a JavaServer Page (JSP) to represent at least a portion of the graphical user interface; and
   including in the defined JSP at least one of the tags to enable interaction between the graphical user interface and the functional component.

8. The method of claim 7, wherein the one or more tags in the custom tag library includes tags for performing one or more of the following functions:
   substituting attribute values, substituting element values, iteration, testing the validity of an expression, or creating a document object model instance.

9. A method for defining a user interface for interacting with a functional component of an application written in Java, the method comprising:
   accessing a custom tag library, wherein the custom tag library includes one or more tags each designating an XPath operation; and
   providing one or more instructions defining a user interface, wherein the one or more instructions provide for interaction between the user interface and the functional component,
   wherein the one or more instructions do not include Java language.

10. A method for accessing data represented by a document object model (DOM) in a system including a custom tag library wherein each tag designates an XPath operation, the method comprising:
    receiving an instruction to access data, wherein the instruction includes a tag associated with the custom tag library;

determining an action based on the included tag;

determining a target data on which the determined action is to be performed by parsing the instruction to obtain an XPath operation indicating the target data; and performing the determined action on the target data.

11. A method for designing a user interface for an application, wherein the application includes data represented by a document object model, the method comprising:

receiving information about contents of the document object model; and defining a user interface including one or more custom tags for accessing the contents of the document object model, wherein the custom tags facilitate accessing the contents of the document object model by permitting use of XPath operations to access data.

12. A method for designing a user interface for an application, wherein the application includes data represented by a document object model, the method comprising:

receiving information about contents of the document object model; and defining a user interface including one or more custom tags for accessing the contents of the document object model, wherein the custom tags facilitate accessing the contents of the document object model by permitting use of XPath syntax.

13. The method of claim 12, wherein defining a user interface includes:

defining a JavaServer Page (JSP) representing the user interface.

14. The method of 12, wherein receiving information about the contents of the document object model includes:

receiving a document type definition.

15. A system for implementing an application including a user interface defined by a JavaServer Page (JSP), wherein the JSP includes custom tags each designating an XPath operation, the system comprising:

a JSP module for executing instructions in a user interface definition;

a custom tag library for resolving a custom tag included in the instructions in the user interface definition; and a tag handler, wherein the tag handler parses the custom tag included in the instructions and evaluates the XPath operation based on the custom tag.

16. A system for implementing an application including a user interface defined by a script, wherein the defined script includes custom tags each designating an XPath operation for accessing data, the system comprising:

a script module for executing instructions in a user interface definition;

a custom tag library for resolving a custom tag included in the instructions in the user interface definition; and a tag handler, wherein the tag handler parses the custom tag included in the instructions and evaluates the XPath operation for accessing data based on the custom tag.

17. The system of claim 16, wherein the custom tag provides a scope for an XPath expression.

18. The system of claim 16, wherein the custom tag allows iteration over an XPath expression.

19. The system of claim 16, wherein the custom tag obtains a value stored at a location represented by an XPath expression.

20. The system of claim 16, wherein the custom tag tests the validity of an XPath expression.

* * * * *